United States Patent [19]
Lubell et al.

[11] Patent Number: 5,797,805
[45] Date of Patent: Aug. 25, 1998

[54] METHOD AND SYSTEM FOR PRODUCING PERSONAL GOLF LESSON VIDEO

[75] Inventors: Alan Lubell, New York, N.Y.; Thomas S. Peters, Boca Raton, Fla.; Earl Takefman, Montreal, Canada

[73] Assignee: The Visual Edge, Boca Raton, Fla.

[21] Appl. No.: 656,156

[22] Filed: May 24, 1996

[51] Int. Cl.$^6$ ................................................ A63B 69/36
[52] U.S. Cl. ....................... 473/266; 473/409; 434/252; 434/257
[58] Field of Search ........................... 473/131, 198, 473/199, 201, 202, 266, 267, 409; 434/247, 252, 257, 258; 463/1, 7, 30–31; 364/410

[56] References Cited

U.S. PATENT DOCUMENTS

| | | | |
|---|---|---|---|
| 3,145,484 | 8/1964 | Bayley | 434/257 |
| 3,408,750 | 11/1968 | McCollough et al. | 473/266 |
| 4,005,261 | 1/1977 | Sato et al. | 434/252 |
| 4,009,331 | 2/1977 | Goldmark et al. | |
| 4,015,344 | 4/1977 | Michaels et al. | 434/257 |
| 4,137,566 | 1/1979 | Haas et al. | |
| 4,163,941 | 8/1979 | Linn, Jr. | |
| 4,713,686 | 12/1987 | Ozaki et al. | |
| 4,828,500 | 5/1989 | Seidel et al. | 434/247 |
| 4,839,733 | 6/1989 | Karamon et al. | 360/13 |
| 4,891,748 | 1/1990 | Mann | 473/266 |
| 5,046,097 | 9/1991 | Lowe et al. | 381/17 |
| 5,111,410 | 5/1992 | Nakayama et al. | 473/221 |
| 5,184,295 | 2/1993 | Mann | |
| 5,210,603 | 5/1993 | Sabin | |
| 5,249,967 | 10/1993 | O'Leary et al. | 473/267 |
| 5,297,796 | 3/1994 | Peterson | |
| 5,333,061 | 7/1994 | Nakashima et al. | 358/335 |
| 5,342,054 | 8/1994 | Chang et al. | |
| 5,486,001 | 1/1996 | Baker | 473/266 |
| 5,506,639 | 4/1996 | Frazen et al. | 352/12 |

Primary Examiner—Jessica Harrison
Assistant Examiner—Mark A. Sager
Attorney, Agent, or Firm—Baker & McKenzie

[57] ABSTRACT

A system and method for producing a personal golf lesson videotape from a visual recording of a person's golf swing and a partially prerecorded instructional golf lesson videotape. The partially prerecorded golf lesson videotape has gaps in predetermined locations into which are inserted the full motion video of the person's golf swing and selected still frames. The system contains two cameras for recording a player's golf swing from the back and side, a computer connected to the cameras for digitally capturing and storing the recorded golf swing, and a computer-controlled video recording device for copying the selected video and still frames of the recorded golf swing into the gaps of the prerecorded videotape golf lesson. The still frames are selected to match the player's position to the position of the professional golfer in corresponding still frames so that a split screen, side-by-side view can be produced showing the player's and professional's positions at various points along a golf swing. Time codes are stored in the predetermined gaps of the prerecorded videotape to help the VCR locate the gaps.

27 Claims, 12 Drawing Sheets

METHOD AND SYSTEM FOR PRODUCING PERSONAL GOLF LESSON VIDEO

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

This invention relates generally to instructional systems for teaching sports activities by recording a person's performance in the activity. In particular, this invention relates to a system and method for creating a personalized golf lesson video by recording a player's golf swing and inserting it and selected still frames thereof in various predetermined places in a prerecorded golf lesson video featuring a professional golfer.

Form and body position are important ingredients to success in many sports activities such as golf, baseball, and track. For example, proper positioning of the head, hands and golf club are crucial to a good golf swing. Naturally, the best way to practice proper positioning is under the direction of a professional golf instructor who can watch the player's swing and correct the player's position and motion. The player's swing can even be video recorded and reviewed later by the player and/or the instructor.

Systems have been proposed which record a player's swing and then analyze the swing according to precise principles. For example, a system described in U.S. Pat. No. 5,333,061 to Nakashima et al. converts recorded video images of a player's swing into a plurality of still images and superimposes on the still images correction pictures consisting of a series of lines connecting various points on the player's body and club. The resulting pictures are then recorded onto a videotape, and additional visual and/or audio information can then be added to the videotape.

Similarly, U.S. Pat. No. 5,111,410 to Nakayama et al. describes a motion diagnosis system in which retro-reflective tape is pasted onto a plurality of points on a player's body and golf club, the player's golf swing is recorded, images of the swing are sampled and converted to digital signals, and positional data is extracted from the plurality of points to which the tape was pasted. The positional data is then compared to reference data to create a diagnosis of the player's swing based on the difference between the positional and reference data.

As yet a further example, a system described in U.S. Pat. No. 4,891,748 to Mann captures a video image of a golf student's swing, generates a superior performance model golf player having physical dimensions scaled to those of the player, and overlays the image of the model onto the image of the student. The model is computer generated and includes composite average swing movements of a plurality of golf players, enhanced using statistical identification of the critical performance patterns of the swing.

These and other proposed systems fail to frilly appreciate that, although proper positioning is important to a good swing, certain aspects of a player's position are more important than others. In fact, highly successful professional golfers have swings which differ in many ways from one another but which are similar in the basic fundamental aspects of a good golf swing. In addition, many aspects of a good swing are not visually apparent in the swing, such as proper weight distribution, tensioning and stretching of various muscles, and the feel of the swing. These aspects can best be communicated verbally from a professional golfer.

Thus, rather than providing a precise geometrical or statistical analysis of a player's swing, as accomplished by the systems described above, it is preferable to teach students which aspects of swing position are fundamentally important to a good swing and which aspects are merely matters of personal style. It is also preferable to communicate the non-visual aspects of a swing to students. One way to accomplish this is for an instructor to explain the basic fundamentals of a good swing while the student and instructor review the student's videotaped swing. However, such personalized instruction is expensive and time consuming, and thus inaccessible to a large portion of the general public.

Thus, a system is needed for providing instruction by a professional golfer on the basic fundamentals of a good swing while allowing students to view their own swings and compare the fundamentals to their swings. An example of the professional's swing should preferably be shown next to the student's swing to help students understand the fundamentals. Such a system should provide the professional the opportunity to explain the non-visual aspects of a swing. The system should be available to a mass population of golfers, and should provide the instruction in a form which allows students to carefully and repeatedly review the instruction at their own leisure and in the convenience of their own homes using standard commercially available video tape players.

The present invention provides such a system and solves these and other problems associated with existing golf video systems.

SUMMARY OF THE INVENTION

It is an object of the present invention to solve the problems described above associated with existing golf video systems.

It is another object of the present invention to help golf players improve their skills.

It is another object of the present invention to allow golf students to view their golf swing and compare it to a professional's swing while receiving instruction from a professional golfer on the basic fundamentals of a golf swing.

It is another object of the present invention to provide a personalized golf instruction video which is relatively inexpensive and which is compatible with most standard commercially available video tape players.

It is another object of the present invention to automatically edit a partially prerecorded standard video tape by inserting additional full motion video or still frames in predetermined locations on the tape.

Some or all of the above and other objects of the present invention are achieved by a system for producing a personal golf lesson video comprising one or more cameras for recording a person's golf swing, capture and memory means connected to the one or more cameras for capturing and storing the recorded golf swing, selection means connected to the capture and memory means for selecting at least one portion of the recorded golf swing, a partially prerecorded golf lesson videotape having gaps in predetermined locations, and a video cassette recording device for copying the selected at least one portion of the recorded golf swing into the gaps of the prerecorded videotape golf lesson.

The partially prerecorded videotape contains a golf lesson given by a professional golfer or instructor explaining various aspects regarding the fundamentals of a good golf swing, including factors such as proper positioning and weight distribution. Time codes are recorded in the gaps in the tape to help the VCR locate the gaps under the control of a computer.

In preferred embodiments, the capture and memory means comprises a capture board which receives a video stream from the cameras and converts it to digital images to be stored on a computer readable memory. Alternatively, a videotape recorder can be connected to the one or more cameras for storing the recorded golf swing on a tape, which tape may be played later and captured by the capture board.

The selection means preferably comprises a touch screen display for displaying the recorded golf swing and for accepting input from a person to select the portion(s), such as still frames, of the golf swing to be recorded onto the partially prerecorded tape. The selected portion(s) are stored in a computer readable memory.

In accordance with the invention, a method for producing a personal golf lesson videotape from a visual recording of a person's golf swing and a partially prerecorded golf lesson videotape comprises the steps of selecting portion(s) of the visual recording to be inserted into the prerecorded golf lesson videotape, locating predetermined gap(s) in the partially prerecorded golf lesson videotape, and inserting the selected portion(s) into the predetermined gap(s). The method may further comprise visually recording the person's golf swing using one or more cameras connected to a videotape recorder or capture board installed in a computer.

The step of selecting portion(s) of the visual recording may comprise displaying all or part of the visual recording on a display connected to a computer system and accepting a selection of the portion(s) through an input device connected to the computer system. The step of selecting portion(s) of the visual recording may further comprise simultaneously displaying all or part of the visual recording and a preselected still frame of a professional golfer at a first point in a golf swing and advancing the visual recording frame by frame so that a still frame from the visual recording may be selected in which the person is shown at a point within the person's swing which substantially matches the first point. These points may include the golf swing set up, the back swing, the down swing, impact, and the follow-through.

Additional content such as video or still frames of the professional's swing or additional audio information such as verbal instructions from the professional may be inserted into the gaps along with the video or still frames of the recorded golf swing. The professional's and player's video or still frames may be placed in a split screen, side-byside fashion in the gaps. The pace of the full motion visual recording of the person's golf swing is preferably adjusted to substantially match the pace of the full motion recording of the professional's golf swing.

Some or all of the objects of the invention are also achieved by a method for automatically and accurately inserting a video segment into a predetermined gap in a partially prerecorded videotape using a computer and a computer-controllable video is cassette recorder (VCR), the VCR operable in at least a first, unthreaded and a second, threaded mode, the first mode being faster and less accurate than the second mode. The method comprises the steps of recording time codes in the gap, retrievably storing in a computer readable memory at least the time codes recorded at the start of the gap, searching the prerecorded tape for the beginning of the gap in the first mode based at least on the time codes recorded in the gap, adjusting the fine accuracy of a frame counter in the VCR, rewinding the prerecorded tape in the second mode to a point just prior to the start of the gap, advancing the prerecorded tape in the second mode to or near the beginning of the gap, and inserting the video segment into the gap.

When a VHS standard VCR is used, which is preferable in order to produce VHS standard tapes usable in most commercially available VCRs, the step of recording time codes comprises recording the time codes in an audio channel of the videotape, such as audio 1. If audio information is recorded in the gap, the time codes may be overwritten.

In preferred embodiments, the method described above begins at the rear of the tape and works backward towards the front in order to complete the process with the tape rewound to the beginning. In addition, because time codes in a VCR are usually reset to 0 when the tape is first inserted into the VCR, time codes are preferably also recorded at the rear of the prerecorded tape so that, when the tape is inserted into the VCR, the VCR can search for the time codes recorded at the rear of the prerecorded tape and set the frame counter in the VCR to the time codes found at the rear of the tape. The VCR can then search for the time codes in the gap based on their relationship to the time codes at the rear of the tape.

BRIEF DESCRIPTION OF THE DRAWINGS

The invention is illustrated in the figures of the accompanying drawings which are meant to be exemplary and not limiting, in which like references refer to like or corresponding parts, and in which.

DETAILED DESCRIPTION OF THE PREFERRED EMBODIMENTS

Figure 1:
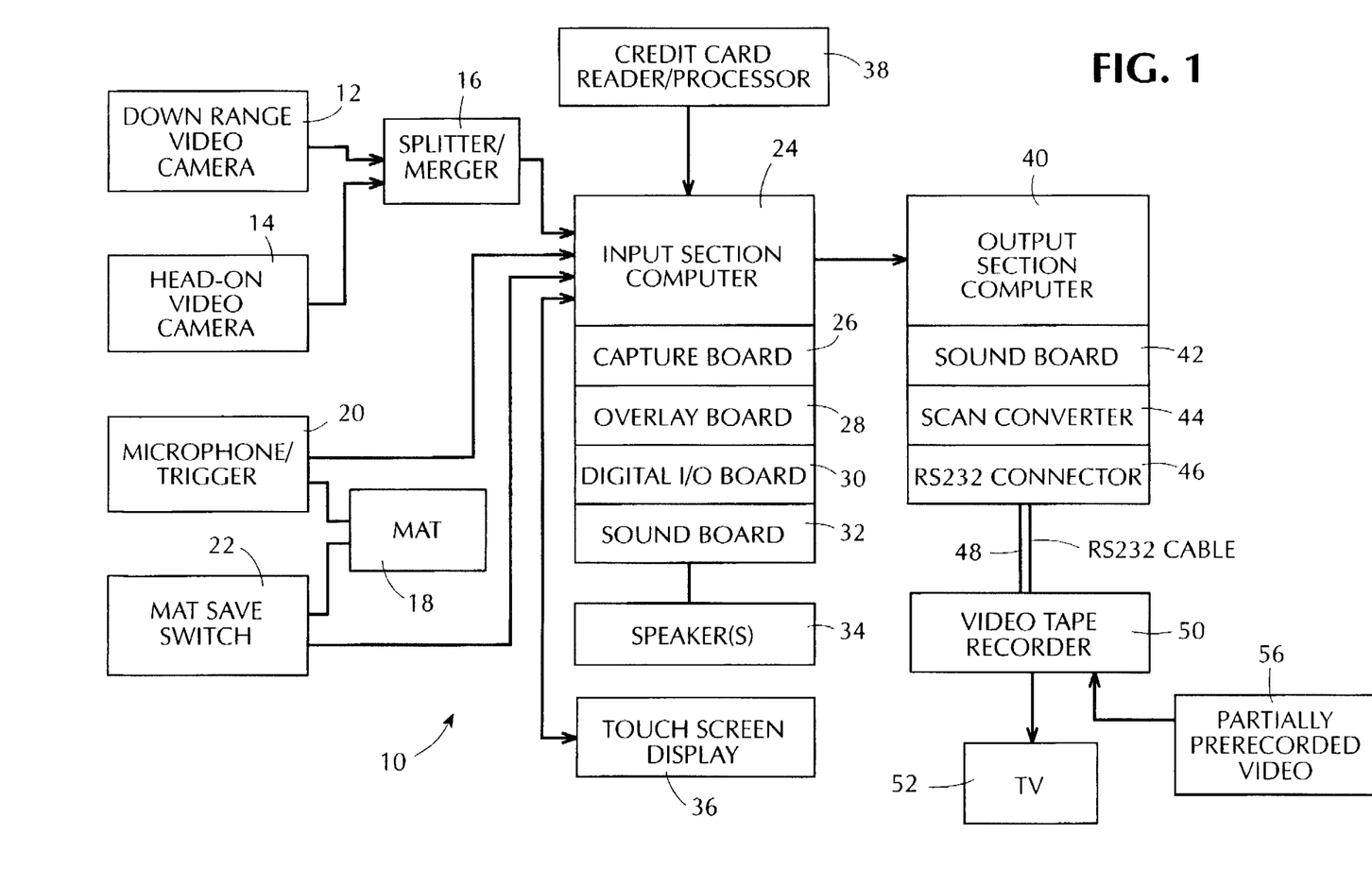
FIG. 1 is a block diagram of the system of one preferred embodiment of the present invention, the system containing a video section, an input section, and an output section.
Figure 2:
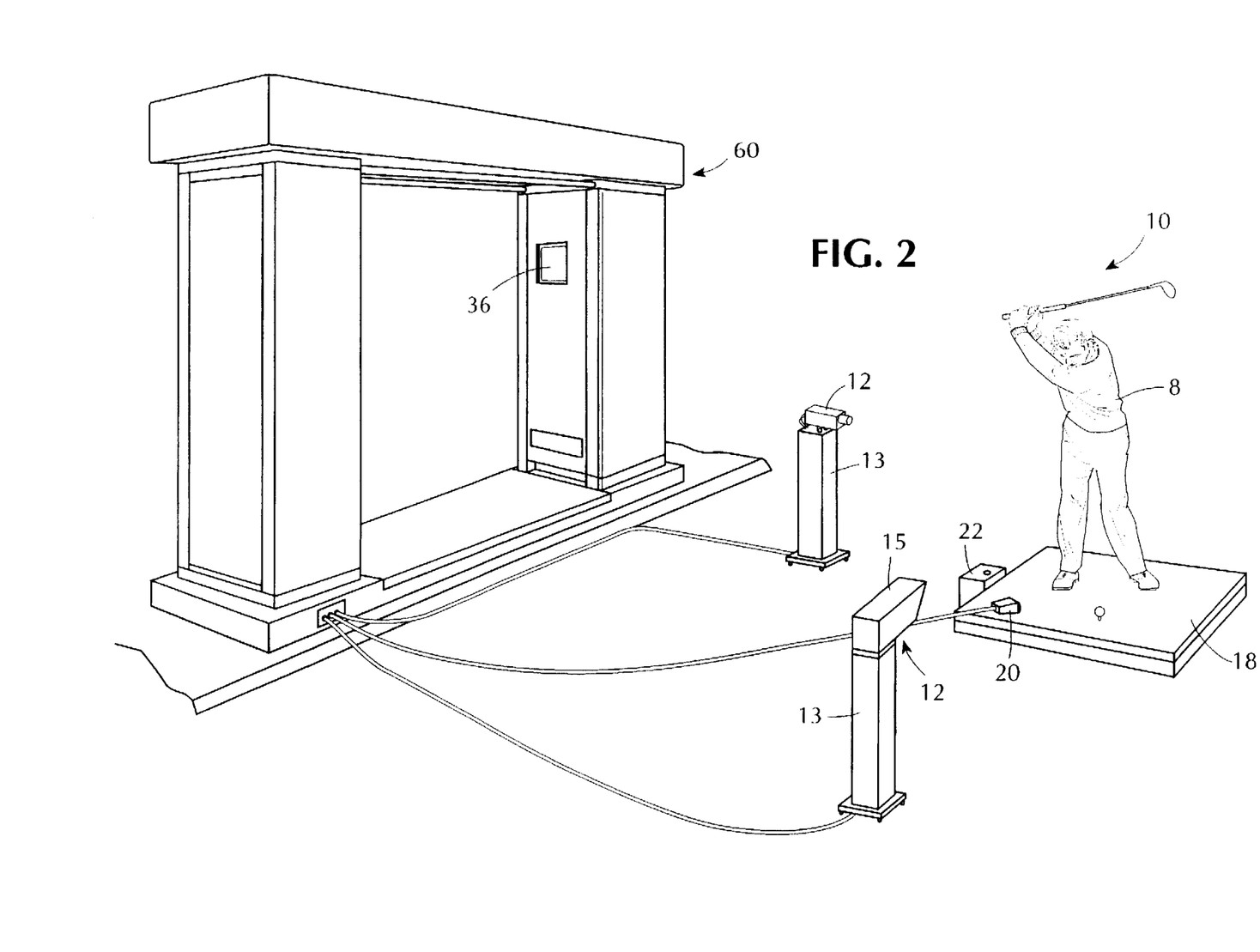
FIG. 2 is a perspective view of the system of FIG. 1.
Figure 3:
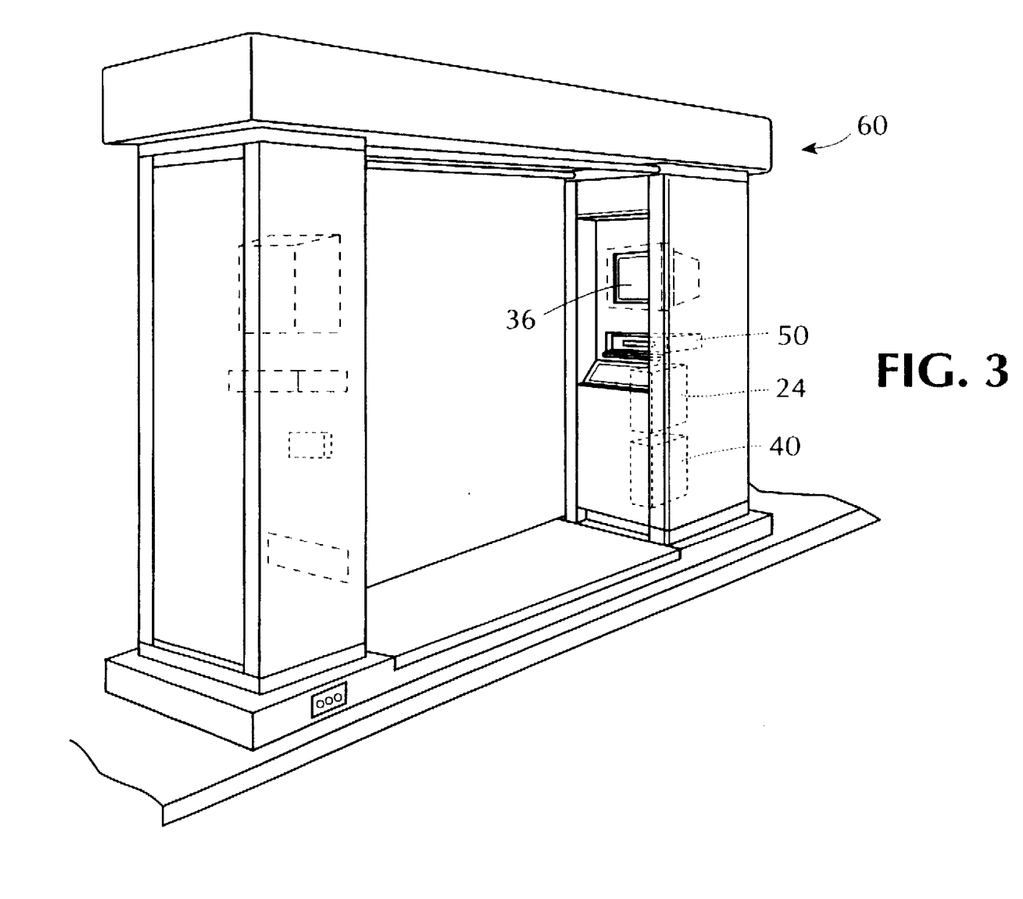
FIG. 3 is a perspective view of the kiosk shown in FIG. 2.
Figure 4:
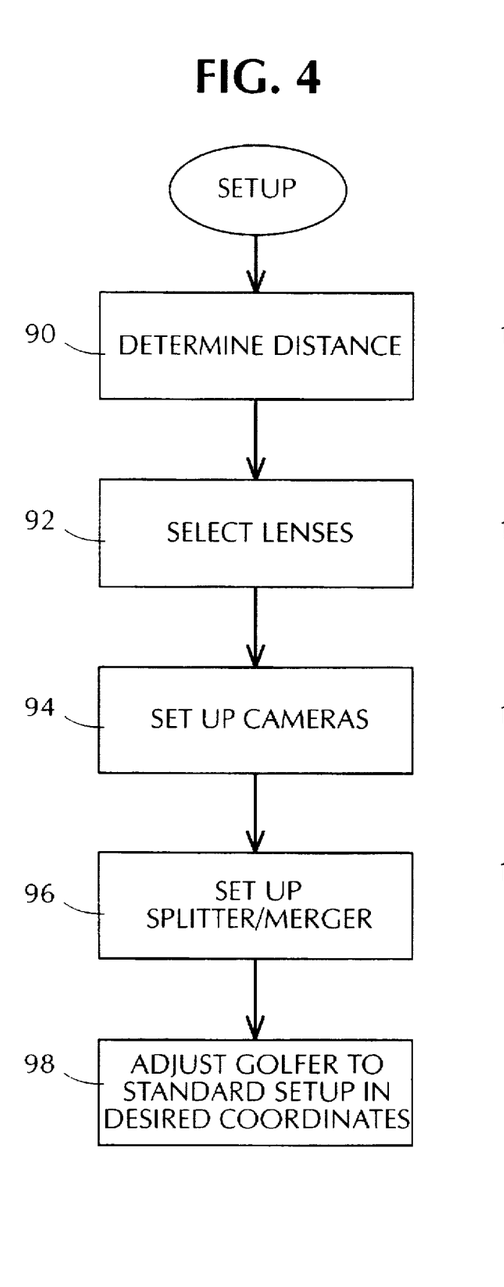
FIGS. 4-5 are flow charts showing the processes of setting up and adjusting the video section of the system shown in FIG. 1.

The preferred embodiments of the present invention will be described herein with reference to the drawings in FIGS. 1-3 showing the system configuration, the flow charts in FIGS. 4-9C showing system operation, and the screen displays in FIGS. 10-12.

The system of one preferred embodiment of the present invention is shown in block diagram form in FIG. 1 and in perspective form in FIGS. 2 and 3. In accordance with the invention, the system 10 comprises three sections generally referred to herein as a video section, an input section, and an output section. The video section is used to record a player's golf swing. The input section digitally captures the recorded swing, processes the captured video, and selects or provides the player the opportunity to select various still frames from the captured video for insertion onto a partially prerecorded golf lesson videotape. The output section automatically and accurately edits the partially prerecorded lesson videotape by inserting the captured video and still frames into predetermined gaps on the tape. The components and operation of each section will be described in turn.

The video section contains two CCD cameras, such as Sony SSC-370 cameras, one 12 positioned to record video in the downrange direction of the player (or golfer) 8 and the other 14 positioned to record video head-on of the player 8. As shown in FIG. 2, the cameras 12 and 14 are mounted on a mobile stand or tripod 13 and are positioned behind and to the side, respectively, of a mat 18 upon which the player 8 stands and performs a golf swing. Side cameras 12 may be placed on the left and/or right side of the player 8 in order to record head-on video for right and left handed players, respectively. A cover 15 may be provided over each of the cameras 12 and 14 to protect it from the climate.

In one embodiment of the invention, the outputs of the two cameras 12 and 14 are transmitted to a splitter/merger 16 such as a Panasonic Digital A/V Mixer model WJ-AVE7 which converts the two views received from the cameras 12 and 14 into a single video stream to be transferred to an input section computer 24. Alternatively, the two video streams from the cameras 12 and 14 can be transmitted over two separate lines into two separate capture boards (as described below), respectively, installed in the input section computer 24. As a further alternative, the golf swing recorded by the cameras 12 and 14 and converted into a single video stream by the splitter/merger 16 can be saved on a videotape for use in a computer-controllable video cassette recorder (VCR) (not shown), such as a Panasonic Model AG-5700 VHS VCR, connected to the input section computer 24 via a RS-232 cable and connector. The Operating Instructions manual for the Panasonic AG-5700 VCR is hereby incorporated by reference into this application as background information regarding the use and operation of the Panasonic VCR. A number of swings by different players can be recorded on a single videotape, each of which can then be processed later at a separate time and place.

After the system 10 has begun operation, the player 8 stands on the mat 18, places a ball on the tee, and swings a club to hit the ball in the player's normal manner. If a system operator is present, the operator runs the cameras 12 and 14 to film the swing and, when the swing is completed, the operator stops the computer capture. When a system operator is present, the mat may be unnecessary and of course may be omitted. If the player is not satisfied that the digitized swing is representative of his normal swing, the operator repeats the process to digitize another swing using the digital capture board 26, such as an Intel Video Recorder capture board, attached to the input section computer 24. The captured video signals from the two cameras 12 and 14 are displayed on monitor 36 in real-time in side-by-side fashion through the use of an overlay board 28, such as a board available from Hauppauge Computer Works, Inc., attached to the computer 24. Many alternative capture and overlay boards are available for use with the system 10. The captured video is then available for further processing as explained below. If the player wishes, additional swings may be taken and recorded until a swing is taken which is representative of the player's normal swing.

If no operator is present, the cameras 12 and 14 begin recording continually once system operation has begun. When the player 8 hits the ball, a microphone 20 attached to or placed near the mat 18 picks up the sound of the golf ball being hit and transmits a signal to a digital I/O board 30 attached to the input section computer 24. Because the entire swing occurs only brief moments prior to and following the hitting of the ball, the computer 24 can determine the length of video which must be captured from the cameras 12 and 14 in order to receive the entire swing. A save switch 22 is also placed adjacent to the mat 18. If the player 8 is satisfied with the swing, he presses the save switch 20 and a signal is transmitted to the computer 24 to capture the most recently recorded swing from the cameras 12 and 14. The recorded video is captured through the capture board 26, and the video signals are simultaneously displayed on a touch screen VGA monitor 36 using the overlay board 28.

The input section of the system of a preferred embodiment of the present invention contains a computer 24, which is a standard personal computer having a processor, such as an Intel 486 or Pentium model processor, ROM, RAM (preferably at least 16 MB), a hard drive, floppy disk drives, and a CD-ROM player. The computer 24 is operated by the Microsoft DOS/Windows operating system and includes video for Windows, Windows 95 and Windows NT. The capture board 26 and overlay board 28 are attached to the computer 24 to capture and process digital images of the recorded video of a player's golf swing and to display the images on a monitor.

When the input section is to be used without an operator, a digital I/O board 30 is also attached to the computer 24 to process signals received from the microphone 20, and a conventional sound board 32 and speaker(s) 34 are provided to provide audio instructions to the player on the operation of the system 10.

A touch screen 36, such as touch screens available from MicroTouch, is connected to the input section computer 24 for displaying promotional and instructional materials regarding the system 10 and for accepting input from the player 8. Alternative input devices, such as a keyboard, mouse, or electronic stylus, may be used with a conventional monitor. A credit card reader/processor 34 is connected to the computer 24 to receive credit card payments for use of the system 10. The system 10 may be wired in a conventional manner to connect via modem and telecommunications link to a credit card company to receive authorization for use of a player's credit card.

The output section of the system 10 contains an output section computer 40, which is a standard personal computer configuration including a processor, ROM, RAM, hard and floppy disk drives, input device(s), monitor, network board, DOS/Windows operating system, a sound board 42, and an overlay board connected to the computer 40. The use of two separate computers 24 and 40 for the input and output sections provides the capability to capture and process a number of recorded golf swings using the input computer 24 while simultaneously editing a partially prerecorded videotape using the output computer 40.

A scan converter 44, such as an Extron Super Emotia converter, is attached to the computer 40 to convert standard VGA signals into NTSC standard video signals. The output section computer 40 is connected via RS-232 connector and cable 48 to a computer controllable VCR 50, such as a Sanyo GVR-S950 or GVR-S955 Video Cassette Recorder. The Computer Control Reference Section of the Instruction Manual for the Sanyo GVR-S950 and -S955 model VCR is hereby incorporated by reference into this application as background information regarding the use and operation of the Sanyo VCR. A partially prerecorded golf lesson video 56 is inserted into the VCR for editing according to the procedures described below. The VCR 50 is connected to a television set 52 to allow the player 8 to watch his recorded swing and the video 56.

The input and output section computers 24 and 40 are connected over a network for transfer of data therebetween. The network may also be accessed remotely via telecommunications link and modem. As shown in FIG. 3, the input and output sections of the system 10 may be contained in a kiosk 60, which may be stationary as shown or which may be placed on wheels so as to be transportable for use in multiple golf courses.

The partially prerecorded golf lesson video 56 contains a lesson on the fundamentals of a good golf swing given by a professional golfer. The professional explains the basic techniques, including proper body position, weight distribution, the extent to which certain muscles should be tensioned or stretched, where a player should be looking, and the general "feel" of a good swing. As shown in FIG. 10, fundamentals may be listed in checklist form on the screen. The professional helps to illustrate the fundamentals with an example swing, which is shown in full motion video as well as in still frames. Telestrations are added to the video and still frames of the professional's swing to further assist the student in understanding the fundamentals.

The partially prerecorded lesson video 56 contains short gaps in predetermined places. In accordance with the invention, the player's full motion swing or still frames are inserted into the gaps so that, in the final edited version of the lesson video, the player can observe his swing or position while the professional is explaining the fundamentals. As shown in FIG. 11, time codes (shown in SMPTE Time Code format of hours:minutes:seconds:frames) are recorded in the gaps to help the output section locate them and automatically and accurately insert the desired video segments therein.

The professional's swing can be inserted in a side-by-side relationship with the player's swing, and still frames of the professional's swing at various positions, such as the set up, the back swing, the down swing, the follow-through, etc., can be inserted in a side-by-side relationship with still frames of the player's swing shown in the corresponding position. See FIG. 12, representing a screen shown in the final, edited version of the personalized golf lesson videotape in which a still frame of the professional 70 is shown side-by-side with the player 8. Additional audio information, such as the professional's verbal explanations, can also be inserted in the gap. Also, telestration effects may be added, as shown by the lines 74 in FIG. 12, to further assist in teaching the fundamentals regarding proper positioning.

When a Beta cam standard VCR is used, the time codes are placed on the tape for each frame in addition to video and audio data. However, VHS standard VCRs do not provide additional room for storing time codes in tape locations outside of the video or audio tracks. Since most people use VHS VCRs, it is necessary for the system 10 to have the capability of producing tapes in VHS format. Thus, in accordance with the invention, time codes are stored on one of the audio tracks, e.g., audio 1. When the video and audio segments are inserted into the gap, the time codes may be overwritten.

The process of setting up and using the system 10 and the operation of the system 10 is now described with reference to the flow charts in FIGS. 4–9C. Initially, to set up the video section, FIG. 4, the desired distance between the cameras 12 and 14 and the mat 18 and player 8 must be determined, step 90, such that players within a given height range will fit within the view of the cameras. The desired lenses are selected, step 92, to obtain the proper focus, and the height and direction of the cameras 12 and 14 are set up, step 94. When used, the splitter/merger 16 is set up, step 96. Also, the microphone trigger 20 and save switch 22 are positioned when used. Finally, the input computer 24 checks that an incoming video stream places the player or golfer 8 in the desired placement within the screen, step 98.

Figure 5:
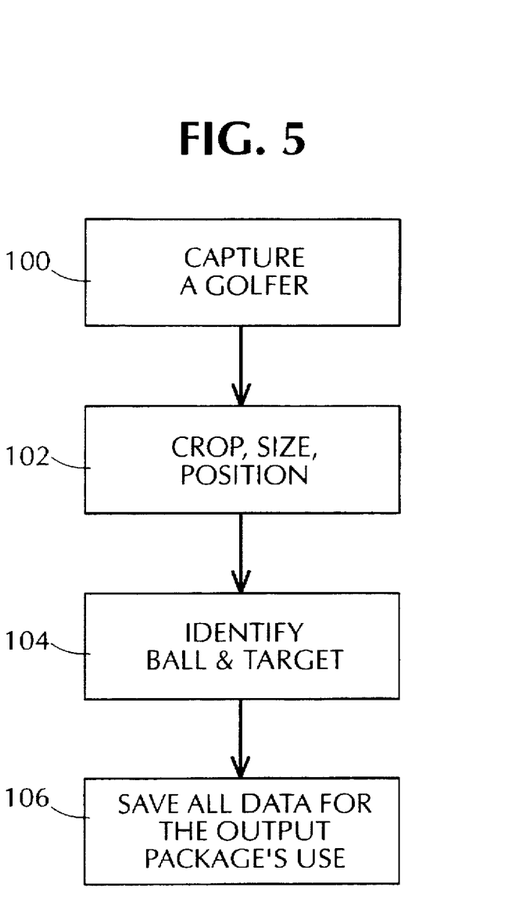

After the cameras are initially set up, a model golfer stands on the mat 18 and a video stream of the model golfer is captured, step 100 (FIG. 5). The captured sample video is then cropped, sized and positioned, step 102, so that the size and location of the golfer within a split screen, which will ultimately be copied onto the prerecorded videotape 56, generally matches the size and position of the professional golfer in previously recorded video. If necessary, the cameras 12 and/or 14 are moved and new video is captured until the incoming video can be properly cropped and sized to match the professional's video. Allowances are made during this procedure for reasonable height variations among golfers. The locations of the golf ball and target positions on the golfer are then identified in the sample captured video, step 104, for future use by the output section to place telestrations, as described herein. All the parameters involved in cropping, sizing, positioning and identifying objects within the sample captured video are then saved for use by the output section, step 106. As a result, incoming video of future golfers can be automatically adjusted to so as to fit properly within the split screen, side-by-side view with the professional golfer. See FIG. 12 for an example of such a split screen view.

Figure 6:
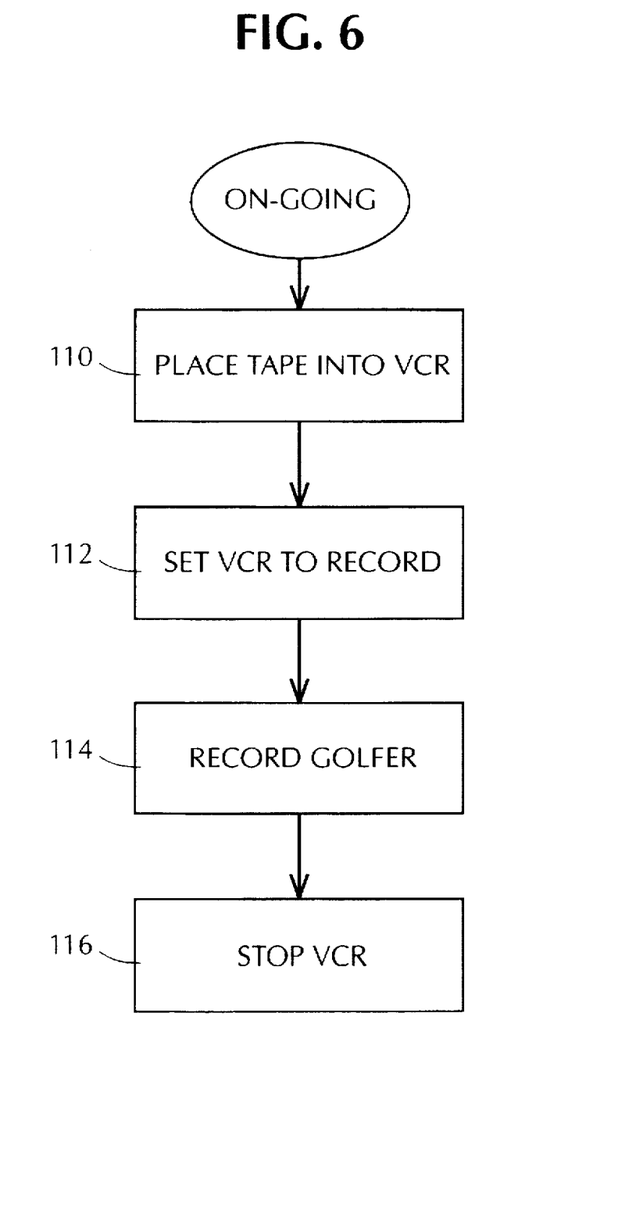
FIGS. 6-7 are flow charts showing the process of recording and capturing a recorded golf swing when the input section of the system of FIG. 1 is under manual operation.

With reference to FIG. 6, when an operator is involved in capturing a golfer's swing, and when a VCR is used to tape the golfer's swing, rather than transmitting the video stream directly to the input section computer 24, the VCR is operated in the usual manner, i.e., by placing a blank tape in the VCR, step 110, setting the VCR to RECORD mode, step 112, recording the golfer's swing, step 114, and stopping the VCR after the golfer 8 has finished the swing, step 116.

Figure 7:
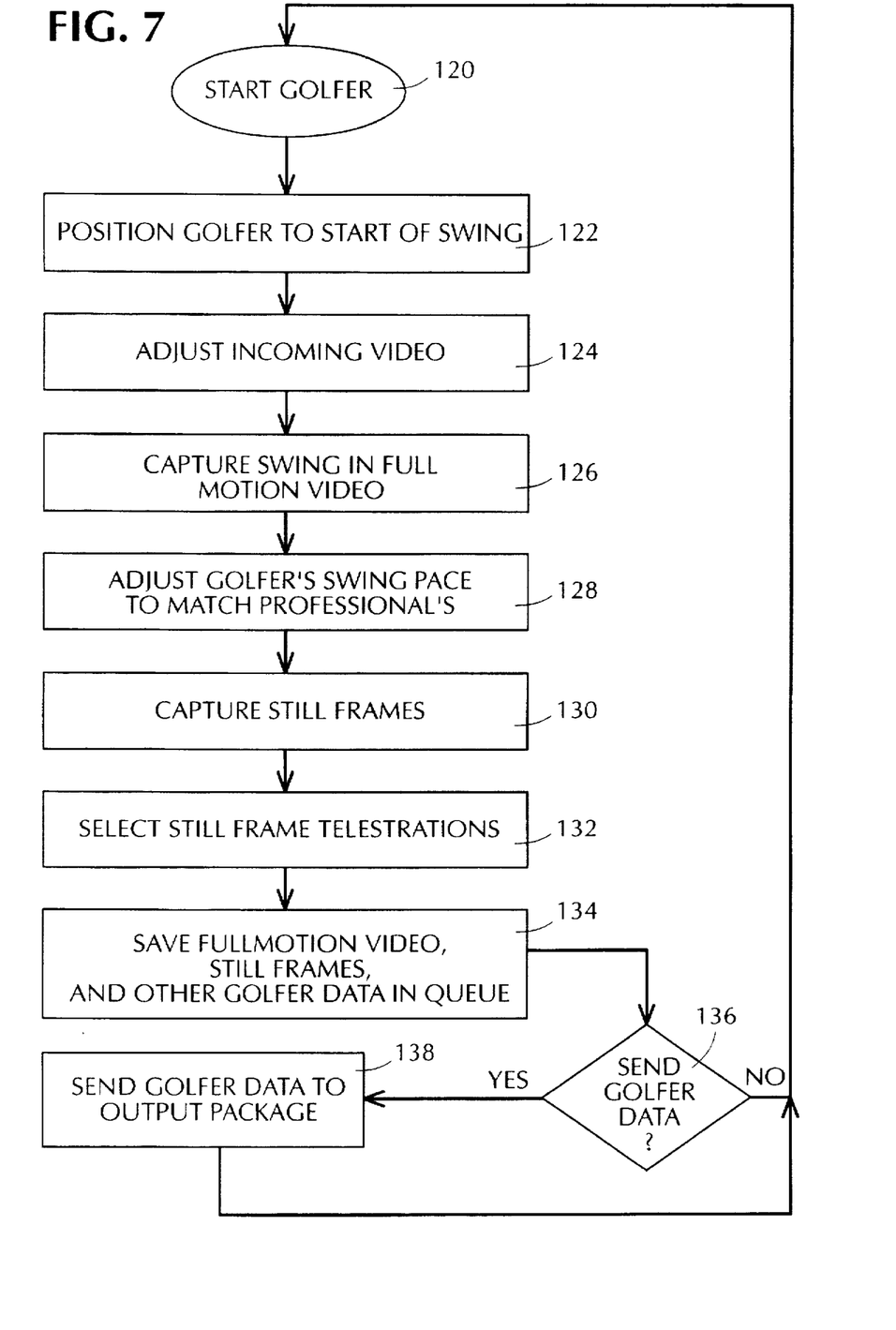

With reference to FIG. 7, to digitally capture the recording of the golfer's swing, the tape of the golfer 8 from the video section is played, step 120, and the video recording is positioned to the start of the golfer's swing and paused, step 122. The two views of the golfer 8, the back or downtarget view obtained from camera 12 and the front or head-on view obtained from camera 12, are displayed in split screen format. The incoming video is then adjusted for factors such as brightness, contrast, and tint, step 124. The VCR is then returned to playing the tape and the recording is captured to disk by the capture board 26 at 30 frames per second at a resolution of 320×240, step 126. The operator stops the capture process at the end of the swing.

The front and back views of the golfer's swing are then adjusted, step 128, by slowing down or speeding up the swing based on the number of frames contained in the digitally captured golfer's swing as compared to the number of frames in the previously captured recording of the professional's swing. Next, the operator advances frame by frame through the video recording of the golfer's swing and selects a number of still frames in which the golfer's position substantially matches the position of the professional in a corresponding still frame, step 130. In preferred embodiments of the invention, eight still frames are selected, including the set up, half back swing, back swing, down swing, impact, and follow-through. The still frames are captured as 640×480 resolution pictures. The two views (front and back) for each still frame are split apart and saved separately.

After capturing the still frames, the operator selects, through the touch screen 36 or other suitable input device, one or more locations on each still frame at or around which telestrations are to be placed, step 132. The telestrations are placed on the frames by the output section of the system 10 during the automatic editing process. For example, in the still frame for the golf swing set up, the operator touches the location of the golfer's head, around which a circle is later telestrated and from which a line is telestrated downwardly towards the mat 18. This telestration helps illustrate the proper positioning of the head in relation to the tee during the set up. See FIG. 12 for an example of telestrations 74 appearing in the final edited version of the personal golf lesson videotape.

The captured full motion video, still frames and other golfer data such as selected telestration locations are placed in a queue for transfer to the output section computer 40, step 134. If a personal golf lesson video is to be produced, and the golfer data is to be sent, step 136, the data is transferred to the output section of the system 10, step 138.

Figure 8:
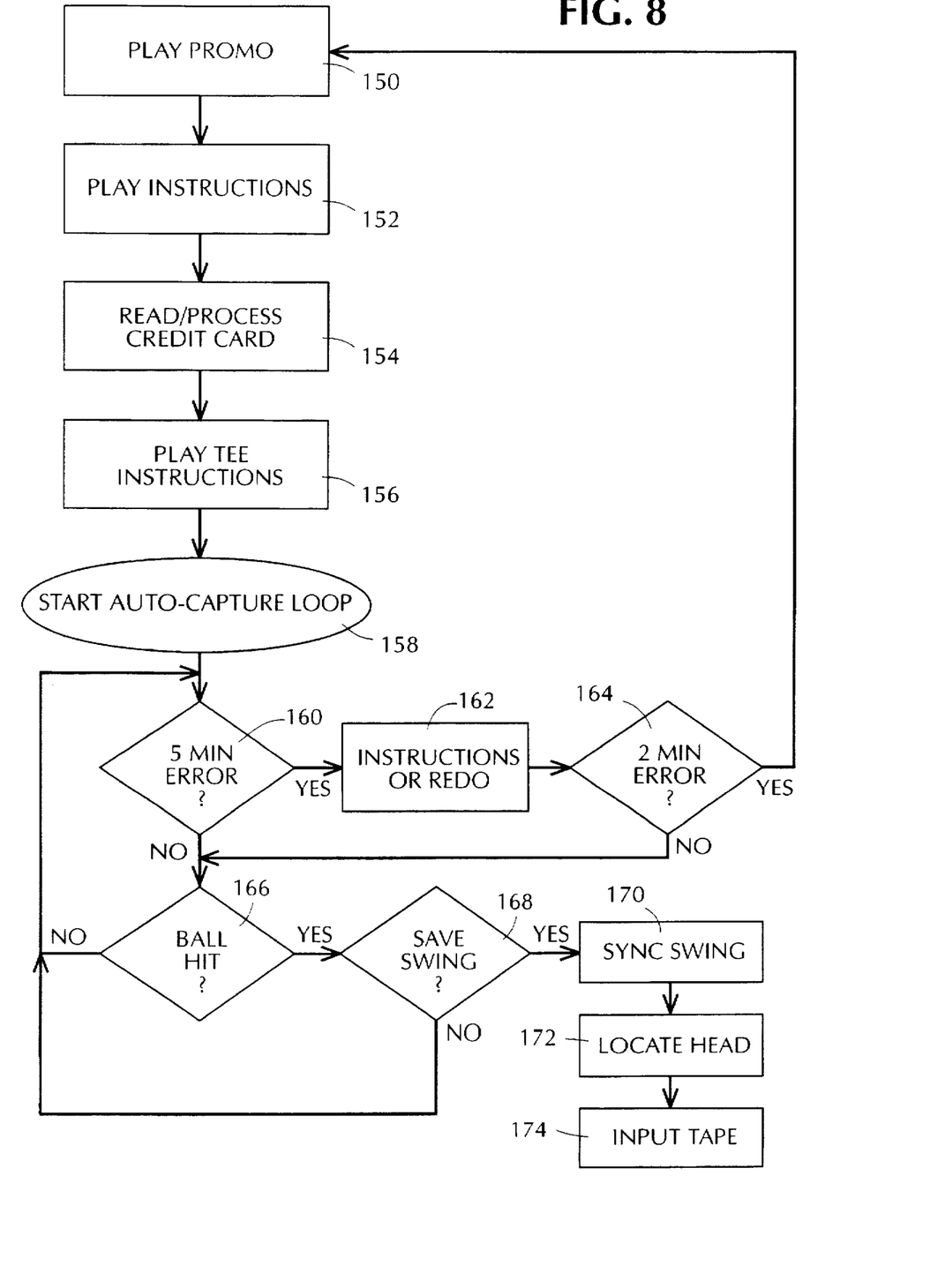
FIG. 8 is a flow chart showing the process of capturing a player's golf swing when is the input section of the system is under automatic operation.

Referring now to FIG. 8, when no operator is present, the system 10 is programmed to display a promotional video on the touch screen display 36, step 150, and to play instructions upon request, step 152. If a person desires to use the system, he enters his credit card information into the credit card reader 38. The credit card information is read and processed, step 154, and the specific instructions on how to set up the tee to take a golf swing are played on the display 36, step 156.

The system 10 then begins a loop, 158, in which the golfer's swing is automatically captured. If no input is received for five minutes, step 160, the system offers the option of replaying the instructions or restarting the auto-capture loop, step 162. If an additional two minutes of inactivity occurs, step 164, the system times-out completely and returns to the promotional video.

If the microphone 20 registers the sound of the ball being hit, step 166, and the golfer 8 presses the save switch 22, step 168, the swing is captured and saved by the input section computer 24 and capture board 26. The swing is then synchronized in pace to the professional's swing as explained above, step 170, the golfer selects the various still frames and locates the position of his head in the still frames for the placement of telestration as explained above, step 172. The professional's still frames can be sequentially displayed in split screen format with the golfer's swing, much as shown in FIG. 12, to facilitate the golfer's selection of the appropriate still frames. The partially prerecorded golf lesson videotape 56, which is provided to the golfer 8 after receiving credit card payment, is then inserted in the VCR 50, step 174.

Figure 9A:
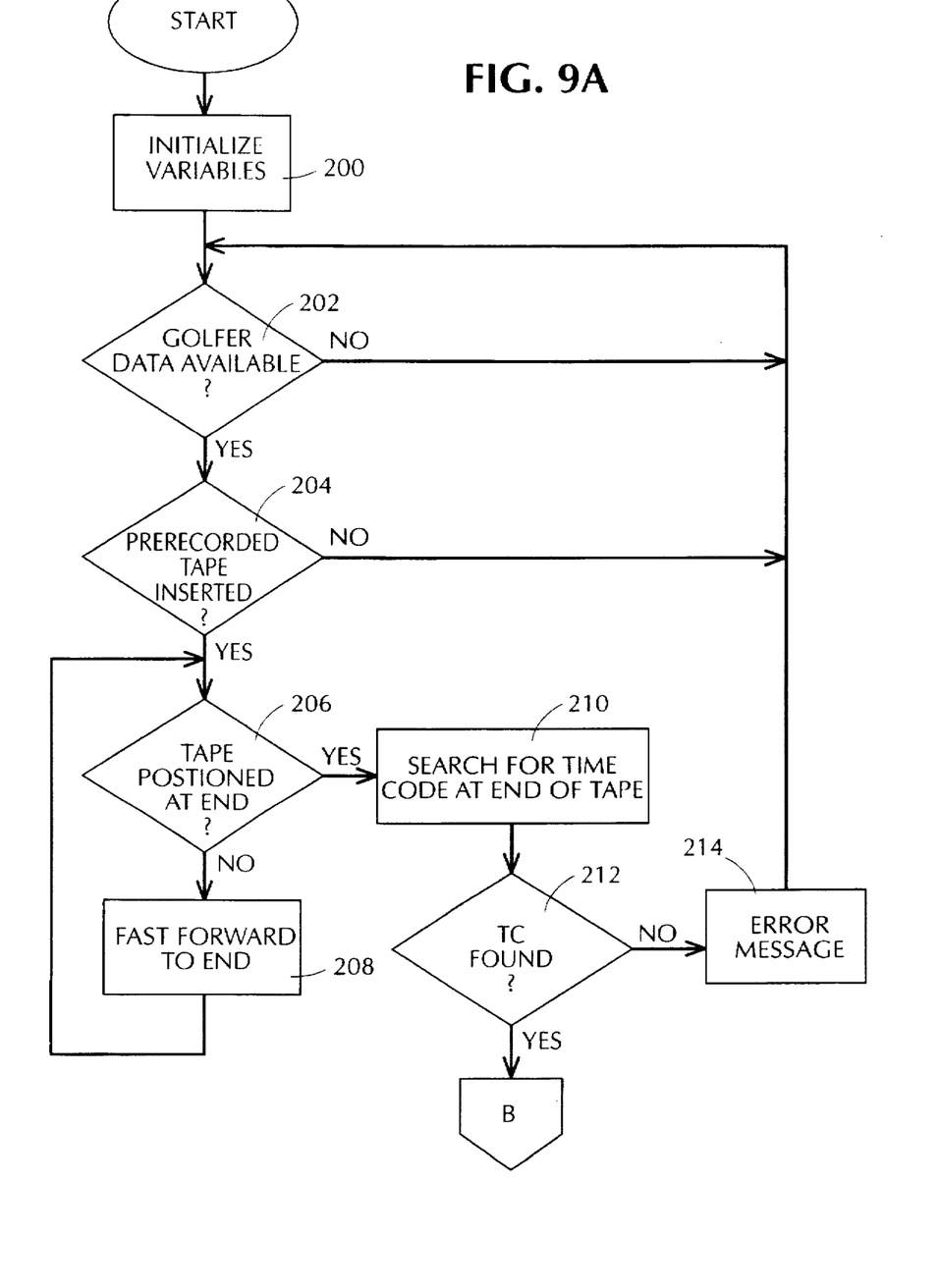
FIGS. 9A-9C are flow charts showing the process of automatically editing a partially prerecorded videotape by inserting selected portions of the captured golf swing in gaps in the tape.

Referring to the flow chart in FIGS. 9A–9C, the output section of the system 10 automatically and precisely edits the partially prerecorded videotape 56 by inserting the captured video and still frames therein as follows. After initializing variables, step 200, including the location at which the output section computer 40 will find files transferred over the network from the input section computer 24, the output section computer 40 periodically polls for golfer data received from the input section computer 24, step 202, including full motion video and still frames and control parameters saved during initial set up and adjustment as described above. When golfer data is available, the output section computer 40 checks whether a tape has been inserted in the VCR 50, step 204, and then checks whether the tape is at the rear, step 206. If the tape 56 is not at the rear, it can be fast forwarded until the rear is reached, step 208.

Although the process of locating gaps and inserting the video and still frames can be accomplished by starting from other points on the tape 56, including the beginning thereof, starting from the rear of the tape 56 and moving backwards is preferable in that it provides the advantage that, when the process is completed, the tape is rewound to the beginning and ready to be viewed without further rewinding.

When a tape is inserted into the VCR 50, the VCR's time codes are usually reset to 0. Time codes are therefore preferably placed at the rear of the tape 56 so that the VCR can find them and the VCR's frame counter will automatically be set to the time codes on the tape. Thus, the VCR searches for time codes placed at the rear of or anywhere on the tape, step 210. If no time codes are found anywhere on the tape, step 212, an error message is given, step 214, such as a message instructing the user to insert an appropriate tape.

Figure 9B:
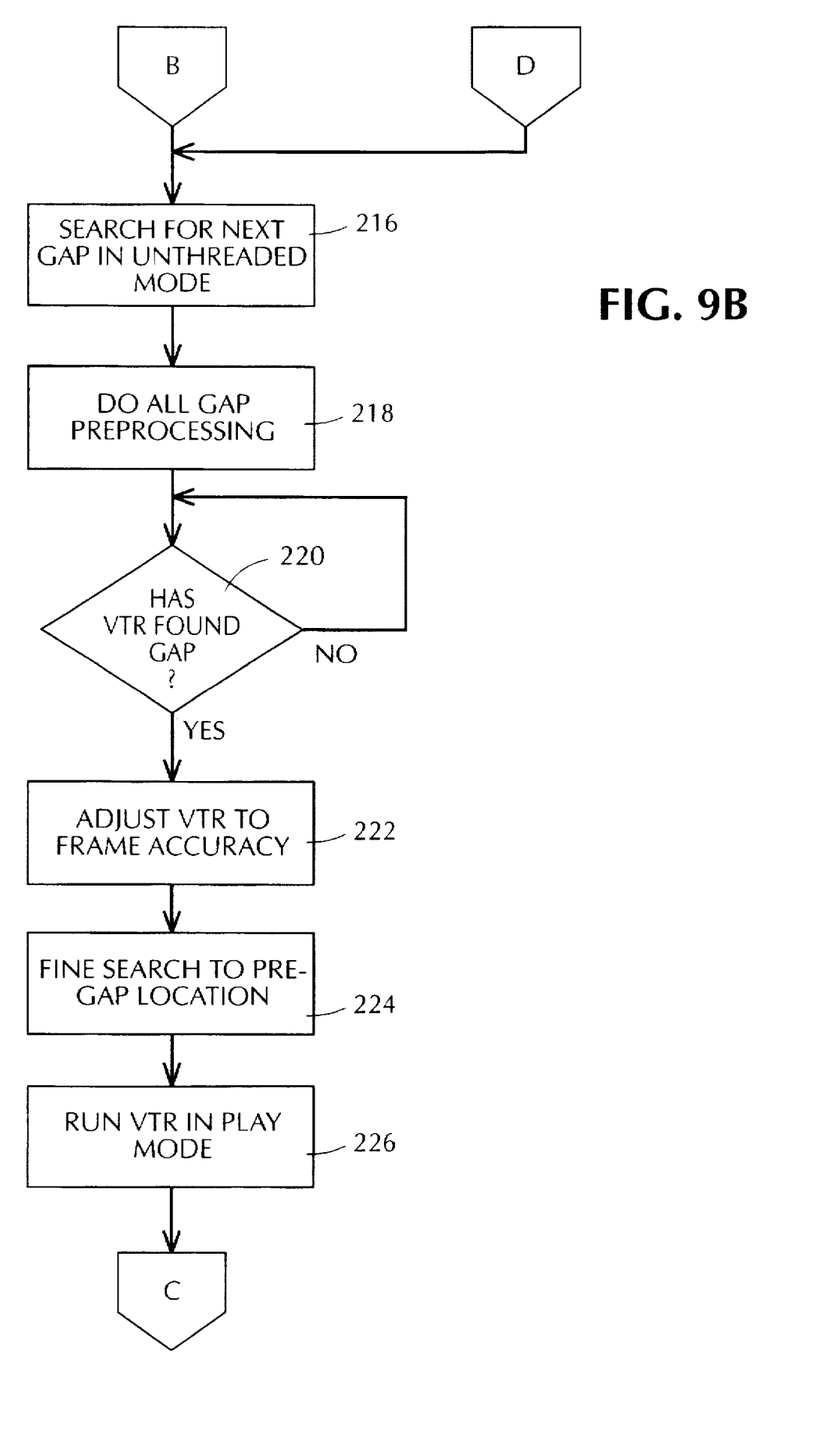
Figure 9C:
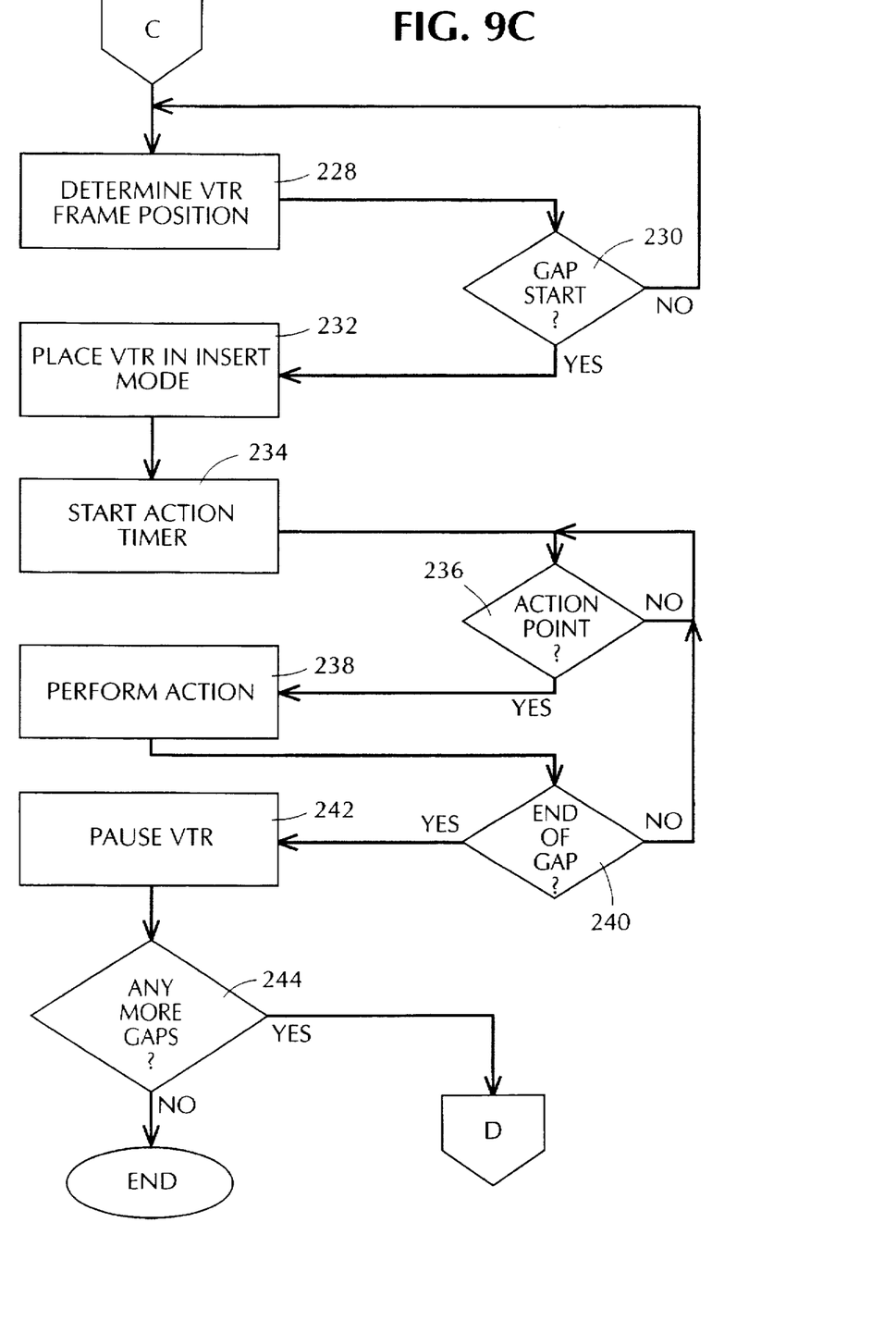

When the time codes at the rear of the tape 56 are found, the VCR 50 is placed in unthreaded mode, which is faster and less accurate than threaded mode, and rewound while the computer 40 searches for the time codes in the immediately preceding gap, step 216 (FIG. 9B). Because the locations of the time codes are predetermined after the prerecorded tape is produced, the computer 40 is given data indicating the specific frames to search for and the expected locations of the gap. Because the search is conducted in unthreaded mode, the search will be faster but will lose fine accuracy. The search will therefore only get close to the correct point on the tape, i.e., the start of the gap. In preferred embodiments, the search rewinds the tape to a short period immediately preceding the gap.

While a gap is being located, gap pre-processing is done, step 218, including loading the audio to be inserted into the gap into RAM and displaying the initial video frame to be inserted into the gap on the TV 52 using the scan converter 44. Once a gap is located, step 220, and the tape 56 is rewound to just prior to the gap, the VCR is adjusted to frame accuracy, step 222, by placing it in play mode and playing over the time codes at the front of the gap. While in play mode, the computer 40 polls the VCR to determine the frame position and resets frame accuracy which was lost during the unthreaded search. After frame accuracy has been restored, the VCR 50 is paused.

The VCR 50 is placed in threaded mode and a fine accuracy search is conducted to a short period just prior to the start of the gap, step 224. Locating the tape 56 just prior to the gap helps to ensure that the VCR tape motors achieve normal operational speed and that any tape jitters is calmed prior to actually inserting new video and audio in the gap. The VCR 50 is once again placed in play mode, step 226, during which the computer 40 polls the VCR 50 to determine frame position, step 228 (FIG. 9C), and checks for the start of the gap, step 230, at which point the VCR will be placed in insert or cut-in/cut-out mode, step 232.

From the time the computer 40 transmits an instruction to the VCR 50 to change from play mode to insert mode until the VCR 50 actually changes its mode, about six frames advance on the tape 56. Therefore, in the preferred embodiments of the invention, the instruction to change modes is actually issued by the computer about six frames prior to the actual start of the gap. The VCR 50 is given the precise cut-out point and instructed to begin inserting the video and audio segments until that point. If the audio segment covers both audio channels (audio 1 and audio 2), the time codes are overwritten.

During video and audio insertion, an action timer in the computer 40 starts, step 234, and controls the video being inserted. When an action point is reached, step 236, i.e., when an action must be taken, the action is performed, 238. Actions include loading pictures, playing video clips, or drawing telestrations, and the actions are performed by retrieving the pictures, video clips or telestrations from memory and transferring them to the video output of the computer 40. When the end of the gap is reached, step 240, the VCR is paused, step 242, while the computer 40 checks whether there are any more gaps expected on the tape 56, step 244. If any more gaps are expected, the computer 40 returns the VCR to unthreaded mode to search for the immediately preceding gap, step 216 and repeats the editing process until all gaps have been filled. The VCR then ejects the completely edited tape 56.

Figure 10:
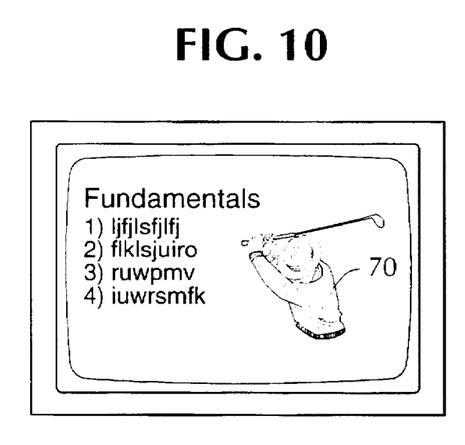
FIGS. 10-11 show still frames of the partially prerecorded videotape before completion of the automatic editing process of FIGS. 9A-9C.
Figure 11:
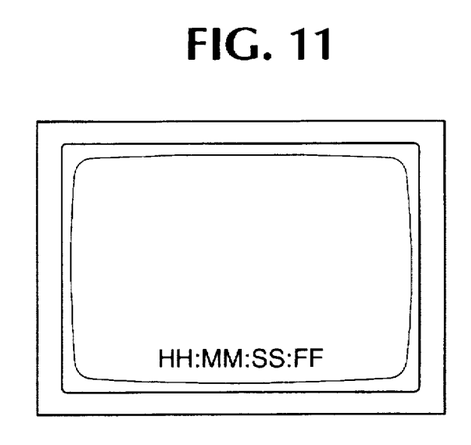
Figure 12:
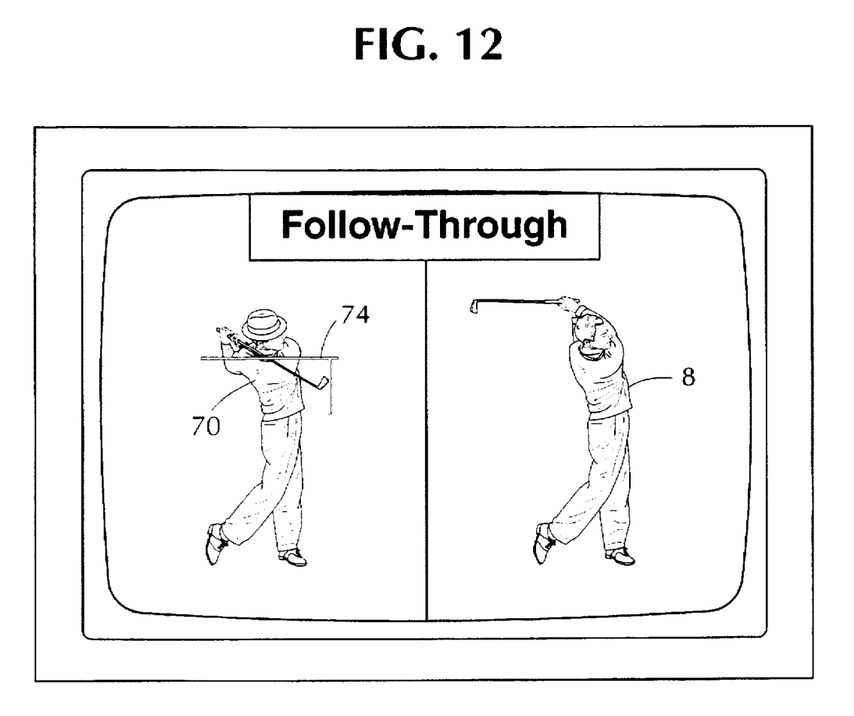
FIGS. 12-14 shows still frames of the prerecorded tape after completion of the editing process shown in FIGS. 9A-9C.
Figure 13:
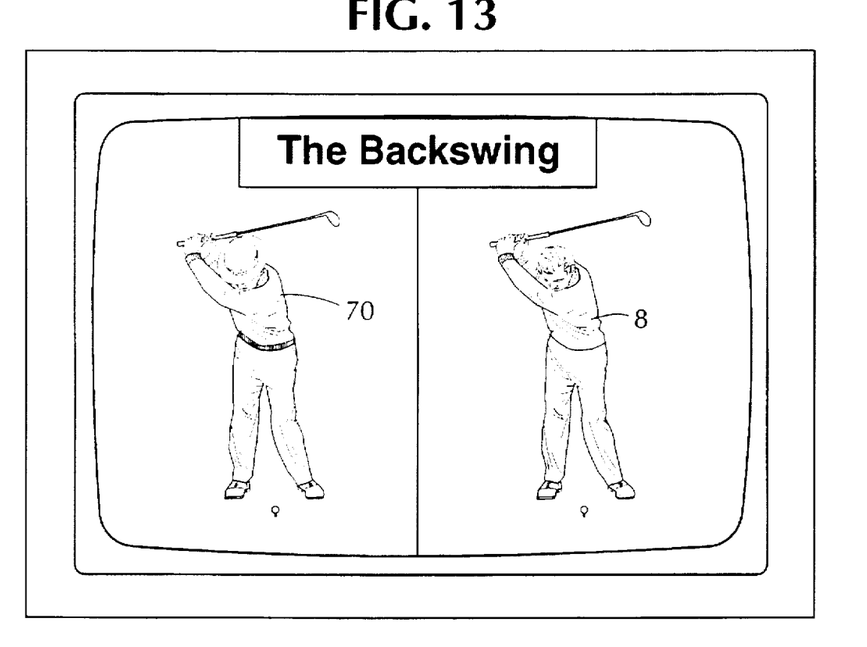
Figure 14:
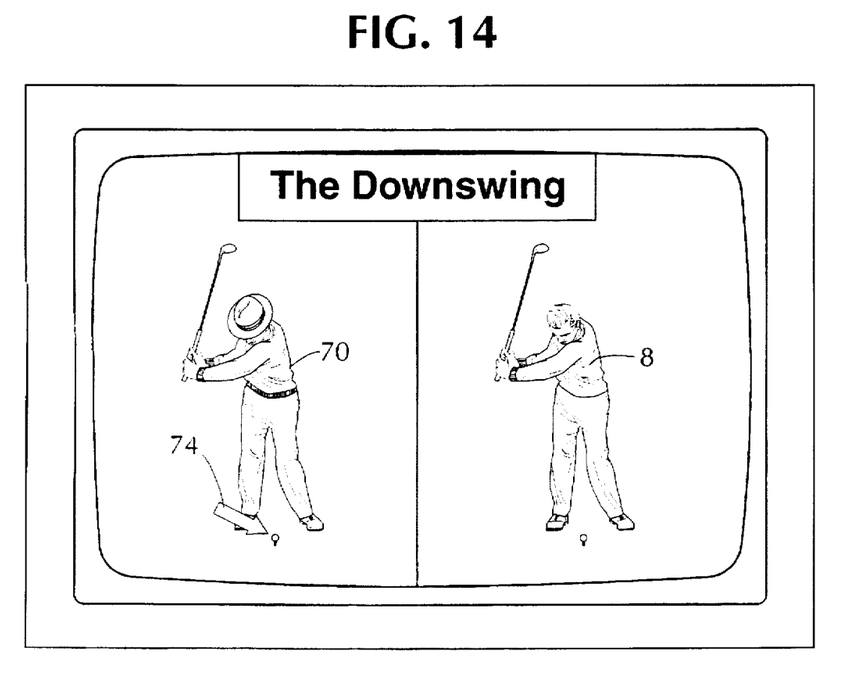

FIGS. 10–14 show still frames recorded on the tape 56. FIG. 10 illustrates a screen in which the professional 70 is explaining fundamentals about one aspect of a golf swing, and a checklist is provided to assist the explanation. The frame shown in FIG. 11, displaying time codes in a gap, appears on the partially prerecorded tape before the automatic editing process is completed. The frames shown in FIG. 12 represent split screen, side-by-side still frames of the player golfer 8 and the professional golfer 70 shown in head-on view in the follow-through, back swing and down swing positions, with telestrations 74 (FIGS. 12 and 14) to help illustrate proper positioning or directions.

While the invention has been described and illustrated in connection with preferred embodiments, many variations and modifications as will be evident to those skilled in this art may be made without departing from the spirit and scope of the invention, and the invention as set forth in the appended claims is thus not to be limited to the precise details of methodology or construction set forth above as such variations and modification are intended to be included within the scope of the appended claims.

What is claimed is:

1. A personal golf lesson videotape produced from a partially prerecorded videotape containing a golf lesson given by a professional golfer, the partially prerecorded videotape having gaps therein in predetermined places into which selected portions of a visual recording of a person's golf swing are inserted shown in split screen format with corresponding portions of a recorded golf swing performed by the professional and the partially prerecorded videotape, at least one of said gaps not being at the beginning or end of said partially prerecorded videotape.

2. The personal golf lesson videotape of claim 1 wherein the selected portions of the visual recording completely fill the gaps in the partially prerecorded videotape.

3. A method for producing a personal sports activity lesson videotape from a visual recording of a person's performance of a sports activity and a partially prerecorded lesson videotape about the sports activity, the method comprising:

partially prerecording onto a videotape a lesson about the sports activity with a least one gap not being at the beginning or the end of said partially prerecorded videotape;

visually recording a person's performance of a sports activity;

selecting at least one portion of the visual recording for recording onto the prerecorded lesson videotape;

locating one or more predetermined gaps in the partially prerecorded lesson videotape; and inserting the selected at least one portion of the visual recording into the one or more predetermined gaps.

4. The method of claim 3 further comprising visually recording the person performing the sports activity.

5. The method of claim 3 wherein the step of selecting at least one portion of the visual recording comprises selecting at least one still frame of the visual recording.

6. The method of claim 3 wherein the step of selecting at least one portion of the visual recording comprises:

displaying all or part of the visual recording on a display connected to a computer system; and accepting a selection of the at least one portion through an input device connected to the computer system.

7. The method of claim 6 wherein the step of selecting at least one portion of the visual recording further comprises:

simultaneously displaying all or part of the visual recording and a preselected still frame of a professional at a first point in performing the sports activity; and advancing the visual recording frame by frame so that a still frame from the visual recording can be selected in which the person is shown at a point within the person's performance of the sport activity which substantially matches the first point.

8. The method of claim 3 wherein the step of inserting comprises inserting the selected at least one portion of the visual recording along with additional content into each of the one or more predetermined gaps.

9. The method of claim 8 wherein the step of inserting comprises inserting into at least one of the gaps a full motion visual recording of the person's performance of the activity along with a full motion recording of the professional's performance of the sports activity.

10. The method of claim 9 wherein the full motion visual recording of the person's performance has a first pace and the full motion recording of the professional's performance has a second pace, further comprising adjusting the first pace to substantially match the second pace.

11. The method of claim 8 wherein the step of inserting comprises inserting into at least one of the gaps a first still frame from the visual recording of the person's performance of the sports activity showing the person at a first point in the performance of the sports activity along with a second still frame from a recording of a professional's performance of the sports activity showing the professional at a point in the performance of the sports activity which is substantially identical to the first point of.

12. The method of claim 8 wherein the step of inserting comprises inserting audio information into the gap.

13. The method of claim 3 wherein the step of locating comprises searching for predetermined time codes prerecorded on the partially prerecorded videotape in each of the one or more predetermined gaps thereof.

14. A videotape made according to the method of claim 3.

15. The method of claim 3 wherein the one or more predetermined gaps each have a start preceded by content prerecorded on the lesson videotape and an end followed by content prerecorded on the lesson videotape, and wherein the step of locating the one or more predetermined gaps comprises locating the starts of the one or more predetermined gaps.

16. The method of claim 3 comprising completely filling the one or more predetermined gaps with the selected at least one portion of the visual recording.

17. A system for producing a personal golf lesson-video comprising:

one or more cameras for recording a person's golf swing;

capture and memory means connected to the one or more cameras for capturing and storing a recorded golf swing;

selection means connected to the capture and memory means for selecting at least one portion of the recorded golf swing;

a partially prerecorded golf lesson videotape having gaps in predetermined locations, at least one of said gaps not being at the beginning or end of said partially prerecorded videotape; and a video recording device for copying a selected at least one portion of the recorded golf swing into the gaps of the prerecorded golf lesson videotape.

18. The system of claim 17 wherein the capture and memory means comprises:

a videotape recorder connected to the one or more cameras for storing the recorded golf swing;

means connected to the videotape recorder for converting the recorded golf swing into digital images; and a computer readable memory for storing digitized golf swing images.

19. The system of claim 17 wherein the selection means comprises:

display means for displaying the recorded golf swing;

input means for selecting the at least one portion of the golf swing; and memory means for storing data representing the selected at least one portion of the golf swing.

20. The system of claim 19 wherein the display means and input means comprise a touch screen display device.

21. The system of claim 17 wherein the partially prerecorded videotape contains time codes recorded in the gaps and wherein the system further comprises means for locating the gaps based on the time codes.

22. The system of claim 17 wherein each gap in the partially prerecorded golf lesson videotape has a start preceded by content prerecorded on the golf lesson videotape and an end followed by content prerecorded on the golf lesson videotape.

23. A method of automatically and accurately inserting a video segment into a predetermined gap in a partially prerecorded videotape using a computer and a computer-controllable video cassette recorder (VCR), the gap having a start preceded by content prerecorded on the videotape and an end followed by content prerecorded on the videotape, the VCR having at least a first and second mode of operation, the first mode being faster than the second mode, the method comprising:

recording time codes in the gap;

retrievably storing in a computer readable memory at least the time codes recorded at the start of the gap;

searching the prerecorded tape for the start of the gap in the first mode based at least on the time codes recorded in the gap;

adjusting the fine accuracy of a frame counter in the VCR;

rewinding the prerecorded tape in the second mode to a point just prior to the start of the gap;

advancing the prerecorded tape in the second mode to or near the start of the gap; and inserting the video segment into the gap.

24. The method of claim 23 wherein the step of recording time codes comprises recording the time codes in an audio channel of the videotape.

25. The method of claim 23 wherein the partially prerecorded videotape has a rear portion which follows an end of content prerecorded on the videotape, further comprising:

recording time codes within the rear portion of the prerecorded videotape;

when the videotape is inserted into the VCR, searching for the time codes recorded at the rear portion of the prerecorded videotape; and setting a frame counter in the VCR to the time codes found at the rear portion of the videotape.

26. The method of claim 23 wherein the step of inserting the video segment into the gap comprises inserting the video segment to completely fill the gap.

27. A partially recorded videotape containing content recorded thereon in sections and gaps in between the sections into which are inserted video segments, the videotape further containing time codes recorded in the gaps on an audio channel of the tape to facilitate location of the gaps.

* * * * *